May 22, 1928.
F. A. GRITT
DISPLAY DEVICE
Filed Oct. 14, 1926
1,671,071
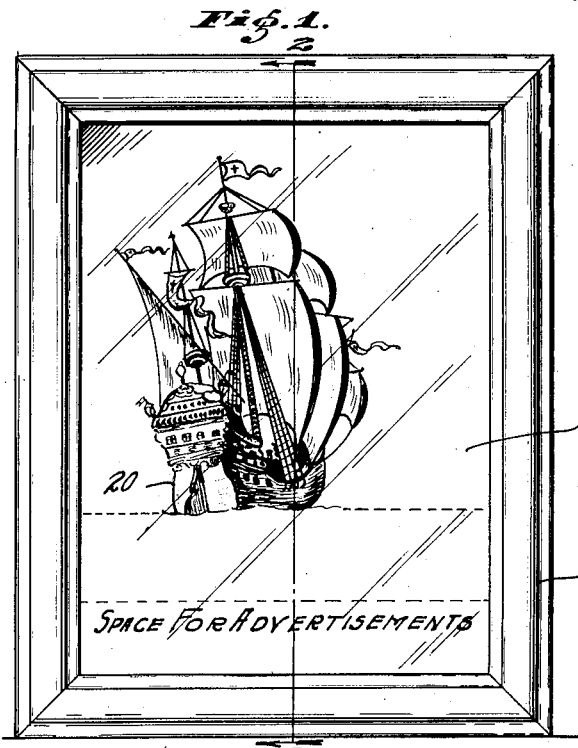
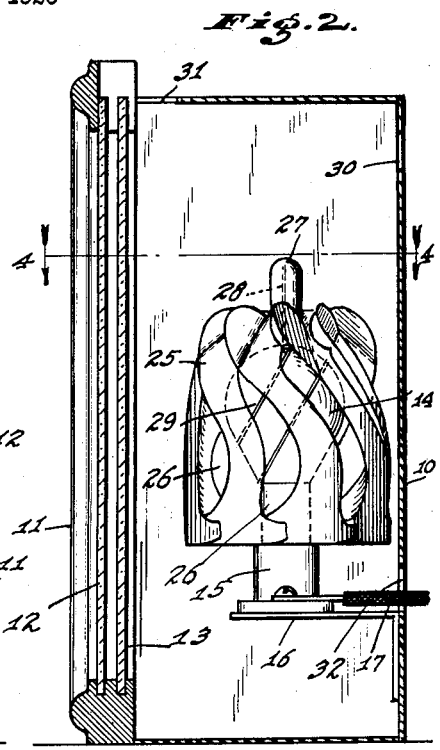
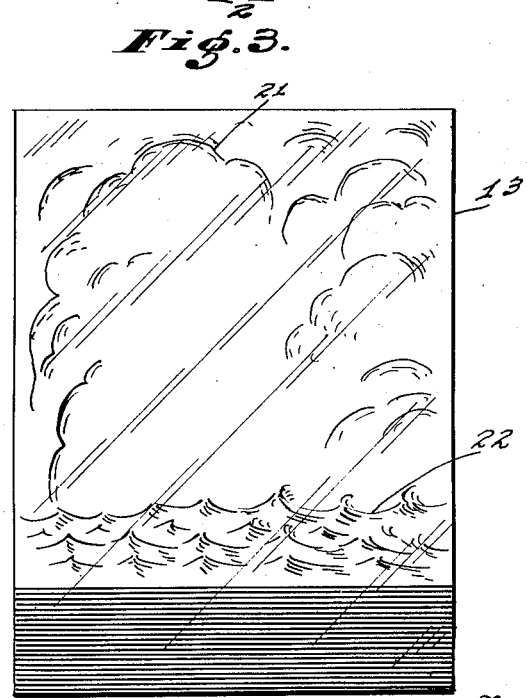
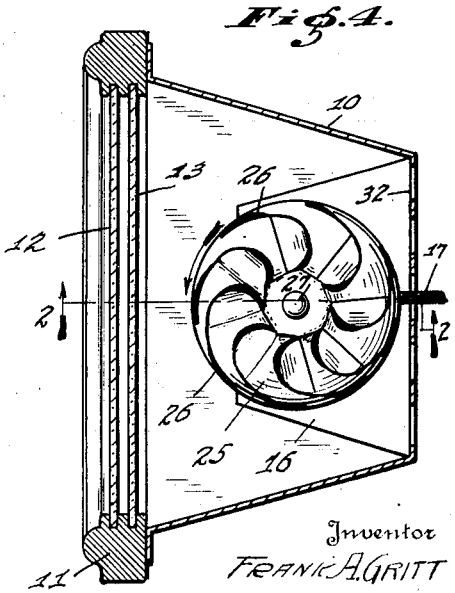
Inventor
FRANK A. GRITT
By Schley & Trask
Attorneys Patented May 22, 1928.

1,671,071

UNITED STATES PATENT OFFICE.

FRANK A. GRITT, OF INDIANAPOLIS, INDIANA, ASSIGNOR TO GRITT, RAGSDALE AND CO., OF INDIANAPOLIS, INDIANA, A CORPORATION OF INDIANA.

DISPLAY DEVICE.

Application filed October 14, 1926. Serial No. 141,543.

It is the object of my invention to produce the appearance of motion in an illuminated stationary picture, and to do so by a simple, inexpensive, and effective mechanism which is substantially free from danger of derangement.

In carrying out my invention, I provide a source of light, a transparency which is illuminated from the rear by such source of light and which carries any portions of the picture which it is desired shall appear stationary, a second transparency behind the first transparency and between it and the source of light, which second transparency carries all portions of the picture which it is desired shall appear to have motion, such as clouds, smoke, running water, etc., and a moving perforated screen located between the source of light and the second transparency to throw shadows which travel across the second transparency, the moving screen desirably having one surface or both made as bright surfaces which reflect the light. The movable perforated screen may be in the form of a rotatable member mounted upon the source of light, as in the shape of an inverted cup, with slits extending both along the sides and inward at the top of such member, and with the portions between the slits bent, particularly at and near the top, to form vanes which are acted upon by the rising column of heated air from the source of light to produce the desired motion of the rotatable member, such vanes also serving to some extent on one or both surfaces as reflectors of the light. The first transparency desirably forms one side of a box which contains and conceals the rest of the mechanism.

The accompanying drawing illustrates my invention: In such drawing, Fig. 1 is a front elevation of a device embodying my invention, showing the front or directly visible transparency; Fig. 2 is a vertical central section on the lines 2—2 of Figs. 1 and 4; Fig. 3 is a front elevation of a suitable rear transparency for co-operation with the front transparency shown in Fig. 1; and Fig. 4 is a horizontal view substantially on the line 4—4 of Fig. 2.

I have illustrated my invention in connection with an open-bottom box 10, conveniently of sheet metal, which at its front edge has a frame 11, conveniently rectangular, which forms the frame of the desired picture. The frame 11 carries two transparencies 12 and 13, which are desirably removable and which may conveniently be mounted in suitable slots on the inner edges of two or more sides of the frame 11. As shown, the top of the frame 11 is open above the transparencies 12 and 13, to provide an opening for the removal thereof. The two transparencies 12 and 13 lie in different planes, desirably parallel and spaced a relatively small distance apart in comparison with the distance from the transparencies to a source of light 14 arranged behind them in the box 10. The source of light is conveniently an ordinary incandescent electric light, suitably mounted in a socket 15 carried upon a shelf 16 projecting inward from the rear of the box 10 and having an ordinary flexible cord 17 for connection to a source of electric current. The two transparencies 12 and 13 may be of any suitable transparent or translucent material, such as paper, parchment, or glass for instance, and if not themselves rigid may if desired have a backing of some rigid transparent or translucent material, as when the picture parts of the transparencies are on paper or parchment backed with glass. However, the desired picture-parts may be directly on glass, if desired.

The front transparency 12 and the rear transparency 13 both carry parts of the desired picture. All the picture-parts which are to appear stationary, such as the boat 20 illustrated in Fig. 1, are on the front transparency 12. All the picture parts which it is desired shall appear to be in motion, such as clouds 21 and waves 22, are on the rear transparency 13. Desirably, the rear transparency is blank behind the stationary-appearing picture parts on the front transparency 12; and the front transparency 12 is blank in front of the moving-appearing parts on the rear transparency 13, as is indicated from a comparison of the pictures shown in Figs. 1 and 2. In Fig. 1 there are shown two horizontal dotted lines, which indicate mere division lines, the portion of the complete picture above the upper dotted line in Fig. 1 showing the clouds 21 projected through from the rear transparency 13, and the portion between the two dotted lines showing the waves 22 projected through from such rear transparency. If the sign is an advertising sign, the part below the lower dotted line in Fig. 1 may be used for an advertisement, which may appear either on the front or rear transparency as desired.

The two transparencies 12 and 13 are not sufficient, by themselves, to give the desired effect of motion in the picture parts depicted on the rear transparency 13. In order to obtain such effect, a rotatable perforated screen 25 is mounted on the lamp bulb 14. This screen may be of a light sheet-metal structure, such as aluminum, which is generally in the form of an inverted cup over and around the lamp bulb, and is provided with a circular series of slots 26 which extend from near the bottom edge of the cup upward along the sides thereof and inward at the top thereof toward the center. These slits or slots may be of any desired shapes, such as the oblique curves shown, and the metal portions between the slits or slots may be bent in various shapes. This bending has for one of its purposes, and a very important one, the provision of oblique vanes which are acted on by the rising column of heated air from the lamp bulb 14 to cause the slitted screen 25 to rotate in the direction of the arrows in Figs. 2 and 4. Another purpose of the bent portions between slits is to provide reflecting surfaces which cause variant deflections of the light rays; for which purpose the inner surface and desirably also the outer surface of the rotating screen are bright. The rotating screen is hung from its center at the top, as by being provided with an inverted glass carrying tube 27 which receives an upwardly extending bearing pin 28 formed at the top of a wire cage 29 which is snapped on to the lamp bulb 14.

In operation, the heated air from the lamp bulb 14, rising, causes the slitted screen 25 to rotate. The heated air may escape from the top of the box 10 through openings 30 and 31, and is replaced by colder air entering the box through openings 32 at the bottom. The rotation of the slitted screen 25 causes alternate areas of light and shadow to travel across the rear surface of the rear transparency 13, which areas of light and shade may be augmented by traveling areas of reflected light from the surfaces of the rotating screen. The picture-parts on the rear transparency 13 are projected through to the front transparency 12, but with an appearance of motion due to the traveling areas of light and shade. The whole picture is illuminated by the light, but the picture-parts on the front transparency 12, such as the boat 20, do not partake of the motion which the projecting picture-parts have.

I claim as my invention:—

1. An illuminated picture having the appearance of motion, comprising a transparency having thereon any picture-parts which are to appear as stationary, a source of light behind such transparency, a second transparency located between the source of light and the first transparency and close to the latter and having thereon picture-parts which are to appear as moving, and a movable perforated screen between the second transparency and the source of light, said movable screen having a reflecting surface for variantly deflecting rays of light on to the transparencies.

2. An illuminated picture having the appearance of motion, comprising a transparency having thereon any picture-parts which are to appear as stationary, a source of light behind such transparency, a second transparency located between the source of light and the first transparency and having thereon picture-parts which are to appear as moving, and a movable perforated screen between the second transparency and the source of light, said movable screen having a reflecting surface for variantly deflecting rays of light on to the transparencies.

In witness whereof, I have hereunto set my hand at Indianapolis, Indiana, this 11th day of October, A. D. one thousand nine hundred and twenty six.

FRANK A. GRITT.